(12) United States Patent
Benz et al.

(10) Patent No.: US 7,474,426 B2
(45) Date of Patent: Jan. 6, 2009

(54) METHOD, DEVICE SYSTEM AND COMPUTER PROGRAM FOR SAVING AND RETRIEVING PRINT DATA IN A NETWORK

(75) Inventors: Viktor Benz, Kirchseeon (DE); Steffen Petz, Poing (DE)

(73) Assignee: OCE Printing Systems GmbH, Poing (DE)

( * ) Notice: Subject to any disclaimer, the term of this patent is extended or adjusted under 35 U.S.C. 154(b) by 539 days.

(21) Appl. No.: 10/499,832

(22) PCT Filed: Dec. 18, 2002

(86) PCT No.: PCT/EP02/14497

§ 371 (c)(1),
(2), (4) Date: Jan. 21, 2005

(87) PCT Pub. No.: WO03/052578

PCT Pub. Date: Jun. 26, 2003

(65) Prior Publication Data

US 2005/0117176 A1    Jun. 2, 2005

(30) Foreign Application Priority Data

Dec. 18, 2001 (DE) ............................... 101 62 251
Jan. 31, 2002 (DE) ............................... 102 03 869

(51) Int. Cl.
*G06F 15/00* (2006.01)

(52) U.S. Cl. .................. 358/1.15; 358/1.1; 358/1.6; 358/1.13; 358/1.16; 709/203; 709/211; 709/219; 709/220; 709/226; 709/238; 707/200; 707/201; 370/235

(58) Field of Classification Search ............... 358/1.1, 358/1.6, 1.13, 1.15, 1.16; 709/203, 219, 709/220, 226, 238; 707/200, 201

See application file for complete search history.

(56) References Cited

U.S. PATENT DOCUMENTS 5,483,653 A * 1/1996 Furman ................. 707/200

(Continued)

FOREIGN PATENT DOCUMENTS

DE         40 13 286          4/2001

(Continued)

OTHER PUBLICATIONS

JP 10-154049 English Translation.*

(Continued)

*Primary Examiner*—Houshang Safaipour
*Assistant Examiner*—Dennis Dicker
(74) *Attorney, Agent, or Firm*—Schiff Hardin LLP

(57) ABSTRACT

In a method and system for storage and retrieval of print data, print data of a print job are transferred in blocks from a data source to at least two of a plurality of print servers connected with one another via a network. Control data regarding respective print data are transmitted to the print servers and are registered and stored in the network. Control data are registered by a central control module of the network and further processing of the print job is allocated by the central control module to an allocated print server so that the allocated print server receives the control data. Using the control data, the respectively allocated print server reads the print data in blocks from the respectively associated print server, processes and/or buffers them as needed, and forwards them to a processing device.

22 Claims, 5 Drawing Sheets

U.S. PATENT DOCUMENTS

| | | | | |
|---|---|---|---|---|
| 5,657,448 | A * | 8/1997 | Wadsworth et al. | 709/220 |
| 5,668,999 | A | 9/1997 | Gosling | |
| 5,671,340 | A * | 9/1997 | Chapman et al. | 358/1.1 |
| 6,115,719 | A | 9/2000 | Purdy et al. | |
| 6,188,487 | B1 | 2/2001 | Matsubara | |
| 6,411,966 | B1 * | 6/2002 | Kwan et al. | 707/201 |
| 7,177,277 | B2 * | 2/2007 | Koponen et al. | 370/235 |
| 2002/0154335 | A1 * | 10/2002 | Matoba et al. | 358/1.15 |
| 2004/0174561 | A1 * | 9/2004 | Fukunaga et al. | 358/1.15 |
| 2005/0088684 | A1 * | 4/2005 | Naito et al. | 358/1.15 |
| 2006/0195616 | A1 * | 8/2006 | Petersen | 709/250 |

FOREIGN PATENT DOCUMENTS

| | | | |
|---|---|---|---|
| DE | 101 07 377 | | 11/2001 |
| GB | 2331387 A | * | 5/1999 |
| JP | 10-154049 | * | 6/1998 |
| JP | 11175292 | | 2/1999 |
| WO | WO 99/38068 | | 7/1999 |

OTHER PUBLICATIONS

Active Directory Services Interface in the Microsoft Exchange 5.5 Environment-p. 1-15-Aug. 12, 2001.
Inside Windows NT-Second Edition-1998 Microsoft Press-David A. Solomon.
Microsoft Windows 2000 Active Directory Technical Summary-p.1-22-Aug. 12, 2001.
UML-Unified Modeling Language-Rainer Burkhardt-1999.
Advanced Function Presentation-Programming Guide and Line Data Reference-2000.
Microsoft Windows 2000 Server Deployment Planning Guide-2000-097-0001946.
Microsoft NET Framework FAQ-Dec. 2000.
NT Directory Services -p. 1-5-NT Directory Services Aug. 12, 2001.
Das Druckerbuch-Gerd Goldmann-May 2001 Océ Printing Systems GmbH.
Forte™ for Java™ Community Edition, Module Creation and Integration Handbook-Sun.

* cited by examiner

METHOD, DEVICE SYSTEM AND COMPUTER PROGRAM FOR SAVING AND RETRIEVING PRINT DATA IN A NETWORK

BACKGROUND

The system and method concerns print data transferred, stored and retrieved between a plurality of devices.

The system and method in particular concerns high-capacity printing systems in which print data and resources are combined into what are known as print jobs and are transferred from a data source to a print production system. Such systems, which comprise computers, control units and print devices, are, for example, specified in the publication "Das Druckerbuch", by Dr. Gerd Goldmann (publisher), Océ Printing Systems GmbH, 6th edition (May 2001), ISBN 3-00-001019-x. The server system Océ PRISMApro is specified in chapter 14. This flexible print data server system is, for example, suited to transfer print data from data sources such as a source computer—the print data in a specific print data language such as AFP (Advanced Function Presentation), PCL (Printer Command Language), PostScript, SPDS (Siemens Print Data Stream), or the language LCDS developed by the company Xerox Corporation—to a print production system. FIG. 1 shows such a print production system 1, in which print data are transferred via a first network 9 from a host computer 9 to a master print server 2, which transfers the entire print data respectively per job to a slave print server 3, 4, 5. The data are then transferred from the slave print server to a first print device 10 for printing. The print jobs stored on the second slave print server 4 are transferred to the print system (which is comprised of two printers 11a, 11b), and the print jobs stored in the print server 5 are transferred to the print device 12 for printing. Up to two printers (twin system) can thus be connected to such a print server 2, 3, 4 or 5. To increase the print capacity, a plurality of printers are also used in parallel operation. This requires a clearly higher administration and control expenditure, and until now has been realized by means of two concepts:

According to a first concept, what is known as the shared spool concept, a printer driver runs on its own computer, whereby, however, all printer drivers access a common storage region (shared spool) via a network segment dedicated to this. Since all printer drivers access this common storage region, all jobs can be printed out on all printers from the spool region or, respectively, all jobs can be arbitrarily switched back and forth between the printers without moving the print data. However, limitations exist in this concept in the possible total data throughput, since the data must respectively be transferred from the spool region via the common network to the respective print device, and delays can occur upon the parallel accesses to the spool region due to the limited bandwidth.

A second concept to increase the print capacity provides to send print jobs to a central computer that analyzes the jobs and distributes them (with the aid of what are known as workflow managers) to different servers which prepare the data (for example, raster the data) according to specification or directly supply the data to a printer, and thus ensure the printing of this data with high capacity. This concept proves itself in the processing of small to medium jobs of heterogeneous data streams with different file types. However, it is less suitable for processing of large homogenous print jobs that, for example, comprise the same form 1000 times with respectively different form data. A problem in such large jobs is that the print event is first started when the transfer is completed. This leads to a completely new transmission from a first print server to a second print server necessary when the printout is disturbed on the first print server, for example given failure of the connected print device. Via the transfer of the data from the first to the second print server, long wait times are created that can reduce the efficiency of a print production system to an unacceptable degree.

Both of the concepts cited above are specified in the publication cited above, "Das Druckerbuch", in chapter 14 under Nr. 3, "Scaleable print capacity of the Océ PRISMApro server".

Methods and systems to store and retrieve print data in which a plurality of storage media are provided are specified in JP-A-11175292, in DE-A1-10107377 -4013286.

A further aspect of the system and method concerns a device system that is controlled with a JAVA-based interface program module. This aspect furthermore concerns a JAVA system that is suitable for administration and processing of files that are stored on a network on an arbitrary storage medium such as, for example, on a computer, a disc drive, a tape storage, a CD-ROM, or another storage medium.

JAVA is a platform-independent object-oriented programming language with which it can be ensured that programs that are written in JAVA can be executed on any computers or operating systems, insofar as a corresponding JAVA system is respectively installed. The fundamental structures of JAVA with which the platform-independence is achieved are specified in the U.S. Pat. No. 5,668,999.

The reading, writing, deletion, renaming and copying of files, as well as the procuring of specific information from files, are implemented in JAVA only for local files, i.e. for files that are physically stored on the same computer on which the JAVA system is installed.

Files whose storage location can be arbitrary in a network, thus local and non-local files whose administration occurs in a computer-spanning plane, are subsequently called logical files. Logical files are thus files in a computer network that cannot be accessed via specific JAVA structures, in particular for execution of administration operations dependent on the system. Counted among these are, for example, remote files, meaning files that are stored on another computer or in a device archive. However, such files can, for example, be identified with regard to their names and their storage locations, i.e. the path names in a network. It is thereby to be desired that such files can be accessed not only for reading, but also that they can be administered in that, for example, file attributes are modified or the storage location (path) is changed.

A basis of JAVA programming is what is known as the derivation of classes. Expressed in brief, what is understood by this is the generation of a new class from an old class, whereby the functions and methods of the old class are adopted in the new class and at least one function that was not implemented in the old class is additionally implemented in the new class.

In other object-oriented programming languages such as, for example, $C^{++}$, as well as in the object-oriented description language UML (Unified Modeling Language), the term "inheritance" is also used instead of the term "derivation". UML is described in "UML—Unified Modeling Language, Objektorientierte Programmierung in der Praxis", R. Burkhardt, Addison-wesley, Mass. (1999), ISBN 3-8273-1407-0.

A program module to administer programs is known from the generally known operating system Microsoft Windows® NT. Furthermore, the service program "Active Directory", with which objects of all types can be administered in a computer network, is comprised in this operating system.

Details about this Active Directory program module are, for example, described in the publications "Inside Windows NT®", David A. Solomon, Microsoft Press, Redmond, Wash., USA (1998), ISBN 1-57231-677-2 on pages 452 to 455, and in "Microsoft Windows® 2000 Server Deployment Planning Guide", Microsoft Press, Redmond, Wash., USA (2000), ISBN 1-57231-805-8 on pages 255-271, 289-294 and 354-359. Furthermore, various items of information have been published on the Microsoft Developer Network (MSDN) Library (under the Internet address: msdn.microsoft.com) regarding Active Directory, for example "Microsoft Windows 2000 Active Directory Technical Summary", "Active Directory Services Interface in the Microsoft Exchange 5.5. Environment", Microsoft Corporation (1997), and "NT Directory Services". Via the same address, information is also to be obtained about what is known as the Microsoft .NET framework, via which the programmability and availability of computer programs can be improved in a heterogeneous network.

The system and method also concerns processing of a print data stream that is prepared for output on a print device. Such a preparation typically occurs in computers that process (adapted to a printer) print files or print data from user programs. The print data are thereby, for example, converted into an output stream of a specific print data language such as AFP® (Advanced Function Presentation), PCL or PostScript. The print data language AFP is, for example, described in the publication Nr. 5-544-3884-02 by the company International Business Machines Corp. (IBM) with the title "AFP Programming 35 Guide and Line Data Reference". In the generation of print jobs with the print data format AFP, in order to generate a document it is frequently provided to link predetermined data, what are known as resource data, with variable data just before the printing. The resource data can be stored at various locations or computers that are, under the circumstances, controlled under different operating systems or platforms.

In large-scale data processing centers, the print data are typically merged (spooling event) in a host computer (main frame), and from this print jobs are generated that are adapted for output on high-capacity printing systems such that the high-capacity printing systems can be temporally, optimally loaded in the production operation. They can thereby largely be used in continuous operation. The print data are thereby ever more frequently decentrally processed: the data are stored at various locations or in various systems and first recombined for printout.

Such high-capacity printing devices, with printing speeds of approximately 40 DIN A 4 pages per minute up to over 1000 DIN A 4 pages per minute, and the associated working methods are, for example, specified in the publication "Das Druckerbuch", published by Dr. Gerd Goldmann (Océ Printing Systems GmbH), edition 4C, October 1999, ISBN 3-000-00 1019-X. Specified in chapter 12 (pages 12-1 through 12-18) of this publication is the server system known under the name PRISMA PRO®, which serves for the preparation of print data streams in production print environments.

In the Quelle Forte™ for Java™ Community Edition, Module Creation and Integration [online], Sun Microsystems, 31 Aug. 2001, http://www.sun.com/forte/ffj/resources/articles/handbook.pdf, in chapter 4 a file system is specified that is suitable for administration of files with computer programs that are programmed in Java.

A print control system is known from U.S. Pat. No. 1-6,188,487 in which print jobs can be distributed on various print servers in a network of print servers.

From WO-A1-99/38068, a print system is known in which control data with which the allocation of the print jobs from a print server to the print devices connected to the Print server occurs is associated with print jobs.

SUMMARY

It is an object to be able to implement the data transmission from a print data source to a network of print data servers per job and optimized for time and system.

In a method and system for storage and retrieval of print data, print data of a print job are transferred in blocks from a data source to at least two of a plurality of print servers connected with one another via a network and are stored there. Control data regarding respective print data are transmitted to the print servers and are registered and stored in the network. Control data are registered by a central control module of the network and further processing of the print job is allocated by the central control module to an allocated print server such that the allocated print server receives the control data. Using the control data, the respectively allocated print server reads the print data in blocks from the respectively associated print server, and at least one of processing and buffering the print data and forwarding the print data to a processing device.

DESCRIPTION OF THE PREFERRED EMBODIMENT

Figure 1:
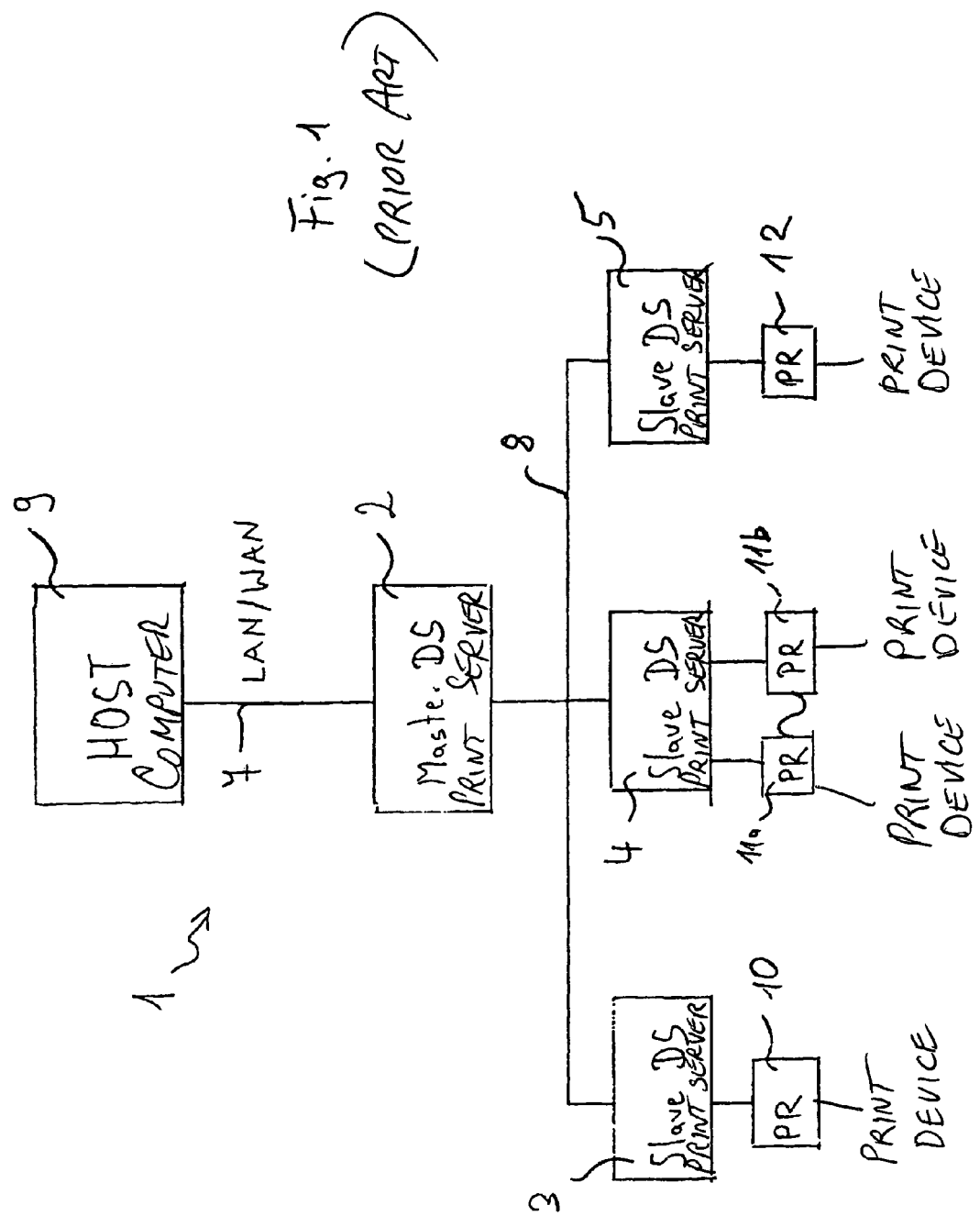
FIG. 1 is a print production system.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

Print data of a print job are inventively transferred block-by-block to at least one of a plurality of print servers connected with one another via a network and stored there. Control data with regard to the respective print data transmitted to the print server are thereby registered and stored on the network. The control data are registered by a central control module, and the further processing of the print job is allocated by the central control module of the network to a print server, such that the print server receives the control data and, using the control data, reads the print data block-by-block from the respective other associated print server. Thus the print data can in particular be processed in an intermediate step and/or buffered as needed, and then forwarded to a processing device.

The system and method is based on the consideration that the execution of the jobs is accelerated overall via a flexible distribution of print jobs to various print servers of a computer network in a print production system. Via the flexible distribution of data of a print job to a plurality of print servers and the allocation of the execution of the print job to one of these print servers (preferably to that which has stored the most print data of the job), the computer network and the print production system (which, in addition comprises the processing devices such as raster processes and/or print device) can be used more efficiently than before.

For example, upon arrival of a print job of multiple megabytes, whose data transmission from an input device to a first print server of the print server network takes multiple hours, the printing can thereby already be begun from the first print server and/or in a second print server while the first print server is still receiving data. Furthermore, a smaller print job that arrives at the print server system after the large print job, and whose processing is likewise provided by the first print server, can thereby be redirected without anything further for processing or printout on another, less loaded print server of the network, such that the large print job runs free of interruption and the small print job is executed efficiently. In an advantageous embodiment, the allocation to a print server or to the processing device or devices already occurs from the start (during the import of the data into the print server network) according to the criterion of which print server/processing system is least loaded at the point in time of the import. This allocation can in fact prove to be disadvantageous in the. course of the print production progress when, for example, an interference occurs in the connected device for further processing (for example in the print device and/or raster processor). In this case, it is particularly advantageous to forward a print job to another print server whole and in particular also in parts for processing, and in particular for further processing. The control data necessary for further processing of the print job are thereby transmitted from the central control module to the other print server. In particular given the partial transmission/further processing, the inventive advantage has the effect that the complete print data does not have to be transmitted to the processing print server, but rather only the not-processed data or the data not yet yet stored by it.

According to a preferred exemplary embodiment, the print data of a print job are transmitted by the data source in blocks to the various print servers connected with one another via a network and stored there. This data transmission is monitored or controlled such that control data regarding the respective print data transmitted to the print server are registered, such that the per-block retrieval of the print data at a device further processing the print data can be controlled by means of the control data. The data transmission is in particular monitored or controlled with a master computer program that runs on a master print server connected to the network. The allocation of the print data to print servers connected in the network, the print servers comprising the master print server as well as further slave print servers connected with the master print server according to the master-slave principle, is controlled by the master computer program. The control can thereby in particular occur such that respectively one data block is allocated to that print server of the network that currently has the smallest load. The load can be continuously monitored and be recorded in respective specific intervals, for example over a few seconds up to a few minutes.

In the per-block transmission or in the per-block retrieval of the print data, data blocks are respectively stored by the data source in the sequence of their input or in the sequence that corresponds to the documents of the print job forming the basis. Given data streams in the AFP print data format, these are in particular the resource data corresponding to the print job and the variable data of the print job. The various resources can thus be divided into various resources on various print data servers of the network, and the various variable data can likewise be divided up on the various print servers. The association and sequence of these data within the document and the storage locations within the print data server network are stored as job-specific control data, in particular in the master print data server, and a later further processing of the data (for example upon printout of the data on a print device) is used for this in order to recognize the original sequence of the documents of the print job as well as the storage locations of the blocks (resources and variable data), and thus to print out the print job completely and in the correct sequence.

According to a further advantageous exemplary embodiment during the input of data of a print job in the print server network, data of the same print job that have already earlier been input in the print server network and been stored on one or the various print data servers are retrieved and further processed. A continuous workflow and what are known as on-the-fly operating modes are thus enabled, via which the data retention within the print data server network is reduced to a minimum. The on-the-fly operating types are thus particularly advantageous for large print jobs that, for example, contain some number of gigabytes of data and whose transmission times on the network are on the order of hours. A further advantage of these operating modes is that data of a print job can easily be transferred from a first print data server by a second print data server, which can occur in particular in the case of a failure of the printer connected to the first print data server or upon an interference of the first print data server.

In a further preferred exemplary embodiment, it is decided by a central control module (that can in particular be a computer program running on the master computer) on which print servers the processing and/or buffering of the print data input into the print server are stored.

For further processing of the print data, in particular one or more print devices, a print system comprised of multiple data-related and/or mechanical printers directly connected with one another can be provided, and/or also a raster processor that generates rastered point data from coded print data.

A further aspect (that can also be viewed independently of the features and aspects illustrated above) concerns the updating of resource data in a print server network. It is thereby provided that, in multiple print servers and in a master print server that is connected with the remaining print servers of the network according to the master-slave principle, a resource update is initially implemented only in the master print server. When slave print servers have a print job to process and thereby require resource data, one then implements a version query regarding the respective resource data on the master print server, such that in the master print server, using a version identifier, it is checked whether the resource data stored therein are identical to those that are located in the querying slave print server. Upon determination of a discrepancy between the versions, either the newer (younger) version is transmitted from the master print server to the slave print server and is used there for processing of the print job, or, when a specific older version is firmly associated with a print job, the older version is used.

According to a further aspect (that likewise can be viewed independently of the previously cited aspects), a system-independent interface program module is provided that abstractly describes functions and methods for handling and administration of files. Furthermore, an abstract file system class is provided that implements at least one part of the functions and methods of the system-independent interface program module, which in turn can be used by the implementations derived from the abstract file system class.

Via the last-cited aspect, a platform-independent, system-uniform method or, respectively, control system is specified with which the administration and handling is possible in a simple manner, both of local files and of logical files. It is based on the consideration that it is possible, via an object-oriented, programmed, system-independent file system interface that defines a wealth of abstract methods and functions for administration and processing, to very universally use this interface and therefore to yield universal application possibilities in the field of file administration and processing.

The predefined interface and its corresponding classes can be used directly for administration and processing of file system objects due to its custom methods and functions, without having to create additional driver programs.

Furthermore, the last-cited aspect is based on the consideration that it is advantageous in a derived system of classes of an object-oriented programmed computer program to implement in a superordinate class only those functions that are required by a plurality or even all of its derived classes. For example, the abstract file system comprises basic functions that are required by all classes derived therefrom such as, for example, the per-block copying of data or the recursive copying and deletion of directories, meaning the implementation of these operations in the directory and all sub-directories belonging thereto.

The universal file system interface likewise enables it to enable a linked or hierarchical interaction of classes of file systems because the universal interface implements all methods implemented by the classes as abstract methods. The administration of the overall file system in a computer network is thus very simply possible even when the computers are operated with different operating systems, meaning in a heterogeneous network.

A network can be expanded very easily via the hierarchical or, respectively, linked structuring of the system in classes, for example when new devices with files to be administered are added.

The file system is in particular defined in the programming language JAVA (and thus operating system-independent), and the system-independent interface program module is in particular a JAVA interface (JAVA file system interface). This aspect of the invention is therefore in particular suitable for JAVA file systems for file/directory administration and processing in an open network structure that comprises computers with different operating systems.

The abstract file system class is in particular a partial implementation of the abstract file system interface and can in particular be a basis for further derivations of the class in the sense of an object-oriented programming language. The system thus enables it to implement administration operations on logical file systems, including the reading and the writing of files, in that a hierarchical and/or linked allocation of abstract file systems occurs in the computer network by means of a uniform interface. A graphical user interface for file display and/or for input of desired file operations is thereby provided, at least in the (with regard to the user) uppermost or, respectively, first interface. In contrast to this, an access to the physical file system associated with the abstract file system occurs in the lowermost or last interface.

A user of a file system is in particular only confronted with the functions and methods of the file system interface, however not with the structure of the interfaces linked with one another. The operations implemented on a physical file system in the uppermost or first interface are made accessible to the user by means of the linked interfaces and the abstract file system class. The physical file systems can thereby be designed in a different manner, for example as remote files, as disc drives, as CACHE storage, as an archive storage (such as a CD-ROMs or magnetic tapes, etc.

Further classes of file systems (file systems) that can increase the functionality of the abstract file system and that likewise can communicate with the file system interface are preferably derived from the abstract file system class. Such classes of file systems derived from the abstract classes are in particular a remote file system that allows access to files on another computer, a mirror file system that keeps a plurality of directories and files provided therein synchronized on different physical and/or logical units (mirrors), and/or a delegate file system that administers a plurality of file systems and file function calls dependent on the respective path of the corresponding file in this file system.

Via the provision of a plurality of classes of logical file systems on which the file system interface can respectively be grounded for the purposes of communication with other logical file systems, the inventive file system can be realized simply. Given a realization in JAVA, in particular the correct independent platform is maintained for individual JAVA applications, although an inventive JAVA file system can be installed on different computer systems and network systems.

The methods and functions of the individual file system classes are converted into the corresponding function calls of the physical file systems, for example converted in a specific computer or operating system, in a tape drive or in another known logical or physical file system such as, for example, in an FTP (File Transfer Protocol) system, in a tar (Tape Archive) system in a Unix or Linux system environment, or in a system with zip files (files that are compressed according to the algorithm by Phil Katz).

The file system interface defines only the names of the respective methods with which the individual file systems are accessed, with which input parameters, and the corresponding return values. The inventive file system is hereby platform- and implementation-independent.

A corresponding program system can particularly advantageously be applied in print systems in which diverse devices such as application computers, host computers, print job processing computers (print servers), carriers of variable and static print data, in particular within an AFP print data network (AFP stands for Advanced Function Presentation Data Stream) and/or archive computers are designed distributed over a computer network.

Furthermore, it is possible to display and to operate various file system implementations in an arbitrarily expandable computer network with a single display and user interface. A file system can thereby in particular also be expanded by the capability of the remote access or the mirroring. Various file systems can be arbitrarily combined, and a selection can occur according to path names. Non-Java programs can also access all file systems of the system via a socket interface.

In particular, an in principle arbitrary number of further file systems can be accessed, for example with a file system in which one or more delegate file systems are implemented.

If a mirror file system is implemented in such a file system, at least two further logical and/or physical file systems on which the individual directories and/or files are kept synchronized are to be subordinated to this file system.

According to a further advantageous embodiment, the print data are transferred (by means of a foreign connection interface (JAVA socket) provided in the interface program module) from a first print server whose files are not directly administered by the interface program module to a second print server whose files are directly administered by the interface program module, and then the print data are further processed on a print server whose files are directly administered by the interface program module.

The print production system shown in FIG. 1 was already previously explained. However, it can also be operated in a manner when the print data arriving in the master print server 2 via the network 7 are forwarded block-by-block via the network 8 to the slave print data server 3, 4 or 5, such that various data of a print job are stored on at least one of the connected slave print servers 3, 4, 5 and/or partially on the master print server 2. For this, a controlling master computer program would be provided with which specific control data would be registered or formed in the master print server 2 regarding each data block of the print job (namely the position of the block in the original in the print data stream or, respectively, in the document of the print data corresponding thereto, as well as the storage location within the print data server network 8).

Figure 2:
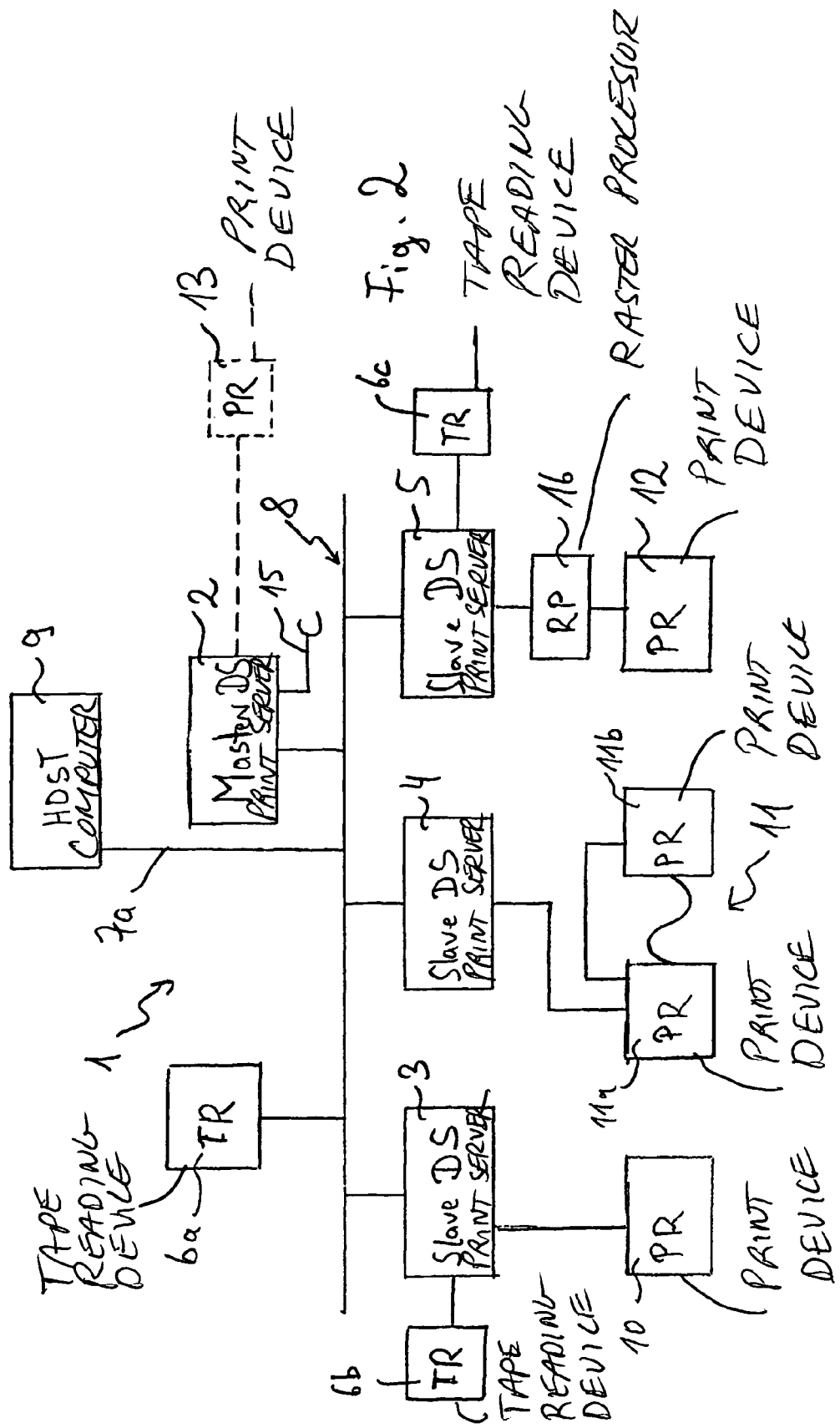
FIG. 2 is a further print production system.

In FIG. 2, a print data production system 1 is shown in which print job data are selectively imported from a host computer 9 via a network connection 7a directly into the network 8 of the print server 2, 3, 4, 5, or the print data are imported from a tape reader device 6a connected to a network 8 or from a tape reader device connected to the print server 3 or 5 into one of the print servers 2, 3, 4, 5. The print data are thereby sent in blocks as data packets to one of the print servers 2, 3, 4 or 5. A control program running on the receiving print server registers import control data on a central control program running on the master print server 2. The master print server 2 comprises a mirrored storage disc system, such that it furthermore remains operational even when one of the storage discs fails.

The control program of the master print server 2 then decides on which of the print servers 2, 3, 4 or 5 the print job is executed, for example using the load. The control program checks which print server or which of the devices for further processing (print servers 10, 11, 12 or raster processor 16) connected thereto is best available, for example which has the smallest load or the smallest processing wait queue, which resource, color properties it has, etc. For this, each print server 3, 4, 5 regularly reports load data and/or configuration data to the central control program. Furthermore, it is tested in the control program which priority the print job has, and it is then decided via which print server the print data are further processed and whether the print data of the print job are split, meaning divided onto multiple print servers. As necessary, it is precisely protocolled as to which data blocks have been sent to which print servers. Furthermore, control data Oob ticket data) are stored in the master print data server 2, said control data comprising information about the position of the respective data block within the print data stream and/or about the storage location (print data server, directory, file name) within the print data server network 8. Furthermore, it is determined by the control program which of the slave print data servers 3, 4, 5 executes the overall job. This execution is preferably likewise allocated to the slave print server 3, 4, 5 that is currently least loaded with the print server connected to it and/or on which the most data blocks of the current print job are stored. The load of a system can, for example, be determined via the anticipated processing time for the print jobs pending for processing in the system, in that the data quantity to be processed can be set in proportion to the processing speed of the system.

To start the print process, the control information cited above is transferred to the selected print server. The transfer of the first job ticket data of a print job can already occur while still later data of the print job are imported into the network 8. A first operating mode, what is known as an on-the-fly operating mode, can thereby be produced in which the data packets stored earlier are already read and are supplied for further processing for printing while later data are still being imported into the network 8. In a further on-the-fly operating mode, data of a print job that are stored in a first print server can be read directly by a second print server and be sent for printout directly from a second print server to a print server connected to the second print server.

In the span of time between the beginning of the data transfer of the print data in the network 8 and the beginning of the readout of the data from the network, the load of the print server 2, 3, 4, 5 or of the print systems 10, 11, 12 connected to them, or of the connected print data raster processor can change. For example, due to failure of one print system, a print system previously categorized as slightly loaded can suddenly be evaluated as overloaded. In this case, depending on the priority of the print jobs pending on this print system, it can be sensible to relocate the further processing of the print job to another print server/print system. It is thereby possible to place the further processing at a location of the print job that has already been printed or is already no longer in the first print system. The print job is thereby subsequently split in a simple manner, in that the control information (job ticket data) for the print data still to be processed are transferred to another print server. Using the print progress feedback received from the print systems, the central control program determines at which location the printout of the print job was interrupted by the failure of the first print system and transfers to the second system the control data necessary for area-precise or, respectively, page-precise continuation of the print job.

The transfer of a print job from a first print server to a second print server can also be sensible when a very large print job and a somewhat smaller print job are pending for processing on a first print server, and when the smaller print job subsequently receives high priority. For this, the control data of the smaller print job are transferred from the first print server to the second print server, and the print job is executed on the second print system. The data of the print job are thereby loaded in blocks on the second print server using the control information.

The master print server 2 can be used for print out exactly like the slave print servers 3, 4, 5 when a printer 13 is attached to it, such that no difference exists with regard to this between the master print server 2 and the slave print servers 3, 4, 5. No difference also exists between master print server 2 and the slave print servers 3, 4, 5 with regard to the possibility of access to the central control and administration program running on the master print server 2: the control and administration program can be accessed by each of the print servers and changes can be effected to its system settings.

During the execution of the print data, the data to be printed are read and then checked as to whether and, as necessary, which device connected to the print server for further processing of the print data is available. Finally, the print data are, as necessary, converted into a data stream required by the processing device (for example from the data format AFP, Advanced Function Presentation, into the data format IPDS, Intelligent Printer Data Stream), and finally corollary data are acquired, for example the page number, for the purposes of statistical or billing-technical evaluation.

It is provided to use resource data for processing of print data in some printer languages, for example in the AFP language already cited above. They comprise, for example, fonts, predefined forms, graphic files (logos) and the like. In order to keep such resource data current in the print system 1, an interface 15 is provided via which such resources can be imported. For this, a different computer, a tape drive, a diskette or, respectively, CD-ROM drive or comparable can be connected to the interface 15. Resources can also be transferred via the host computer 9 to the master print server 2. In order to not have to completely send the resource data to each of the slave print servers 3, 4 and 5, which would significantly load the print server network 8, the resource data are initially stored only in the master print server 2. Upon execution of a job on the master print server 2, the slave print servers 3, 4, 5 subsequently, respectively query whether the resource data stored there are younger (newer) than the respective data still stored in the querying slave print server. For this, version data and/or generation data of the respective resource files are compared between the slave print server and the mast print server 2. In the case that resource data that are required in the current job are stored in the master print server 2 with a younger date, this younger resource file is thus transferred from the master print server 2 to the querying slave print server, stored there and used for processing of the current print job. In the event that a specific resource version is to be used in the current print job to be processed (for example in the reprinting of an old print job) and the use of an associated, older resource from the control corollary information of this print job is clear (for example via a date or version characteristic number), this is detected via query or, respectively, analysis of the control information and the corresponding older resources are sought in the system, and if possible this older version is used in place of the younger version.

Figure 3:
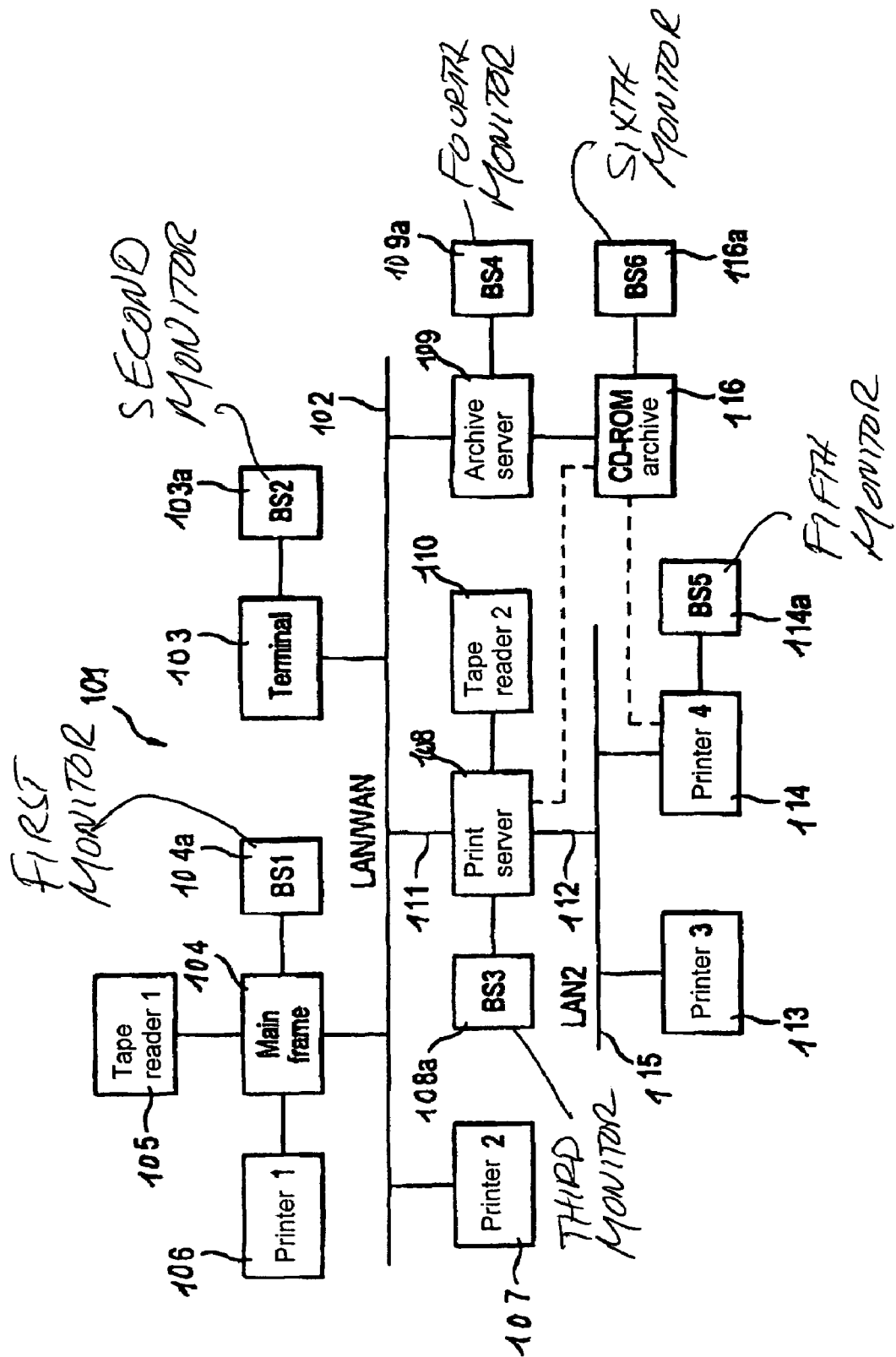
FIG. 3 is a third print production system.

In FIG. 3, a high-capacity printing system 101 is shown in which various system components via a data network 102, which can be a local network (local area network, LAN) or also a larger network (wide area network, WAN, internet). At least one client terminal 103 on which print jobs can be generated is attached to the network 102. The terminal 103 is a known computer, for example a personal computer PC with an operating system such as, for example, Microsoft Windows, Windows NT, Linux or the like, with a connected monitor 103a.

The print jobs can selectively also alternatively be generated on a main computer (main frame) 104, or at the least data from the main frame 104 can be inserted into the print job. The main frame 104 of the computer center is controlled via a suitable operating system control such as MVS, BS2000 or VSE. Control functions and displays can ensue on the main frame 104 via the monitor 104a connected thereto. Moreover, a tape reader 105 as well as a first high-capacity printer 106 is directly connected to the main computer 104 (main frame).

Moreover, a second printer 107, a print server 108 and an archive server 109 are connected to the data network 102. The print server 108 is in turn connected with a second tape reader 110 as well as a monitor 111. In addition to the connection 111 between the print server 108 and the main data network 102, the print server 108 is connected via the connection 112 with a second local network 115 to which further printers 113, 114 are connected. The print server 108 as well as the printer 114 can optionally be connected with a system for production of archive storages (CD-ROM) 116. However, the archive system 116 is primarily connected to the archive server 109.

Additional monitors 109a, 116a and 114 are connected with the respective devices 109, 116 and 114.

To create a print job in the data format AFP, for example on the client computer 103 or on the print server 108, it is necessary to access corresponding resource data. Under the circumstances, these resource data can thereby stored on another computer, for example on the host computer 104, on which is installed a different operating system than is installed on the client computer 103o the print server 108. It is therefore necessary to have available a suitable auxiliary means with which files can be accessed independent of the operating system. The JAVA file system interface 120 which is shown in FIG. 4 serves for this.

Figure 4:
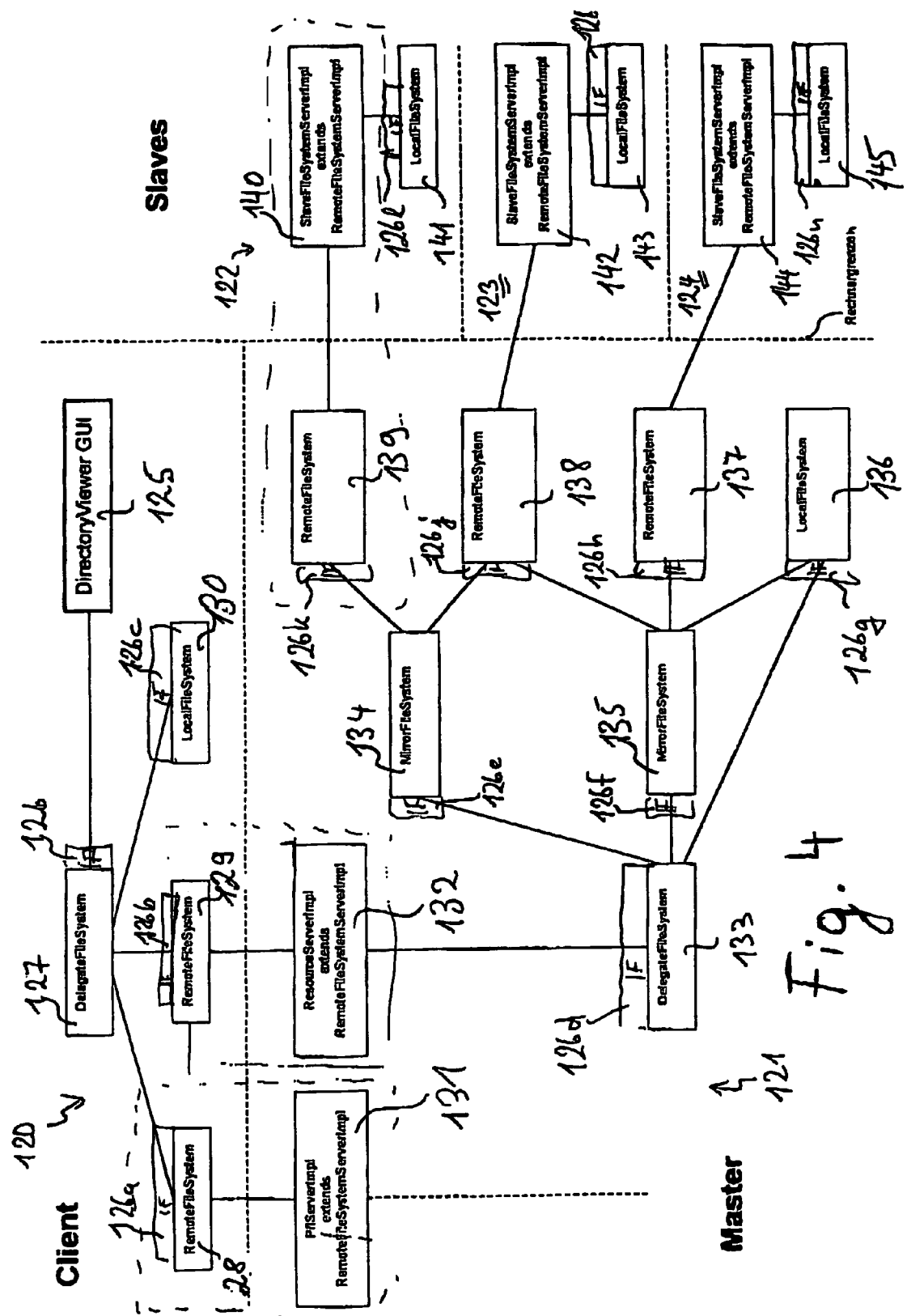
FIG. 4 is a system structure with a JAVA file system interface.

In the system structure shown in FIG. 4, a client 120 is connected with a master 121 to which in turn are connected various subsystems (slaves) 122, 123 and 124. Within the client computer 120, a display module is provided for file directories (directory view user interface) 125 on which the user can access old files of the shown system, meaning local client files, as well as files in the master system 121 and the files of the slave 122, 123 and 124, at least in the form of a directory display. For this, the graphical user interface 125 is connected to the universal interface 126 programmed in JAVA. The JAVA interface 126 defines an abstract file system and is not an implementation of a real file system. It is therefore only "attached" to such an implementation such that the implementation can access the interface or can read this for control of the communication with other implementations. The interface 126 is, for example, attached to the delegate file system 127 with which multiple file systems 128, 129 and 130 connected in turn thereto can be administered.

Typical file administration and processing functions are defined in the JAVA interface 126, for example the copying, renaming and deletion of files and file directories; the query of the content of a file directory; the query and modification of the file or directory properties such as size, creation and modification date and the like, as well as the reading and writing of files; the generation of new files and directories; or also an incident mechanism to react to changes. Further typical file or, respectively, directory administration properties can be provided. The abstract file system implements the JAVA interface 126 only partially, however it is the basis for derivation of the further implementations such as the remote file system 128 and the local file system 130.

The JAVA file system 126 is also attached in identical form to the remote file system 128, to the remote file system 129 and to the local file system 130. It thus forms the platform- and operating system-independent connection point between the various implementations 127, 128, 129 and 130. The files locally stored on the client computer 120 can be accessed with the implementation local file system 130. It implements all functions and methods defined in the JAVA data set for application to the physical files that are stored on a local storage, for example on a fixed disc. Files of the master computer 121 that are contained in what are known as a print file library can be accessed via the first remote file system 128. For this, the remote file system 128 is connected with the computer program module "Remote File System Server Impl" 131 as a type of transmitting and/or receiving interface, such that the functions defined in the interface 126a can also be executed on the directories or, respectively, files of the server library (print file library). A corresponding connection also exists between the second remote file system 219 and the resource server implementation 132. This implementation is in turn connected with a delegate file system 133, to which in turn are connected multiple implementations, namely both of the mirror file system implementations 134 and 135 via the corresponding JAVA file system interfaces 126e and 126f. The delegate file system 133 can additionally also delegate methods and functions to the local file system 136 of the master computer 121 via the JAVA file system 126g.

The mirror file system 134 is in turn connected via both of the JAVA file system interfaces 126k and 126j with remote file systems 138, 139. Via the remote file system server implementation 140, the JAVA file system interface 126, the remote file system 139 in turn accesses the local file system 141 with which handling and administration operations of the previously cited type can be implemented in the slave computer 122. The same operations can occur on the slave computer 123 via the remote file system 138, the remote file system server implementation 142, the JAVA file system interface 126m and the local file system 143, whereby the mirror file system 134 respectively ensures that the data stored on the slaves 122 and 123 are mirrored identically.

The files kept identically mirrored by the mirror file system 135 are kept mirrored in the local file system 136 of the server via the remote file system 137, the remote file system server implementation 144, the JAVA file system interface 126n and the local file system 145 in the slave computer 124, and/or via the remote file system 138 and the system program modules connected thereto in the slave computer 123.

The entire system structure shows that a chaining of the various file systems via the JAVA file system interface 126 is possible in such a way that a hierarchical chaining of the system calls occurs. The delegate file system 127 thereby stands at the uppermost point of the hierarchy with the connected JAVA file system interface 126, of which the file operations can be distributed like a tree structure to practically any number of other computers (servers and/or slaves). The respectively connected interfaces 126a, 126b, etc. up to 126n are thereby fashioned respectively identical to the JAVA file system interface 126. In addition to the platform-independence, this also has the advantage that a tap on any of these systems is possible for a graphical user interface (GUI), as shown in the client 120 using the directory viewer GUI 125.

In the following, some classes that implement the JAVA file system interface are shown in excerpts with some Java source code lines.

Class AbstractFileSystem:

This class serves as a basis for further derivations and comprises basic functionalities such as the per-block copying of data from the InputStream to the OutputStream, event distribution to registered listeners, recursive copying and deletion of directories, recursive searches in directories, processing of path names, etc. A derivation of this class must overwrite all abstract methods of this class (for example, moveTree( )) and all methods of the interface (for example, isDirectory( )) not implemented here.

```
public abstract class AbstractFileSystem implements FileSystem
{
    public void move(String source, String destination) throws
    FileSystemException
    {
        if (!source.equals(destination))
        {
            moveTree(source,destination);
            fileDeleted(source);
            fileCreated(destination);
        }
    }
}
```

The method move( ) calls the method moveTree( ) (that must still be implemented by a derivation) and subsequently notifies all listeners that the source file has been deleted and target file has been generated.

Class LocalFileSystem:

This class is an implementation for the access to local files. It maps the FileSystem methods to methods of the file access classes java.io.File, java.io.FileInputStream and java.io.FileOutputStream that are available by default in Java. Since it is derived from AbstractFileSystem, it possesses its capabilities and is therefore significantly more capable than the standard file access methods of Java. Furthermore, it offers the possibility to map logical path names to real path names

```
public class LocalFileSystem extends AbstractFileSystem
{
    public File getLocalFileObject(String path) throws FileSystemException
    {
        String physicalPath = resolvePath(path);
        if (physicalPath==null)
            throw new
    FileSystemException(res.getString("Invalid_path_")+path);
        return new File(physicalPath);
    }
    public String[ ] list(String directory) throws FileSystemException
    {
        File file = getLocalFileObject(directory);
        if (file.isDirectory( ))
            return file.list( );
        else
            return null;
    }
    public boolean isDirectory(String path) throws FileSystemException
    {
        return getLocalFileObject(path).isDirectory( );
    }
}
```

The method getLocalFileObject ( ) is not a component of the interface, however it is used by other methods in order to obtain a java.io.File object. It first cancels a possibly present mapping and then generates the desired object. The list method serves to read out the content of a directory. The method isDirectory determines whether the specified path is a directory.

With the subsequently method setAttributes, attributes of a file or a directory can be changed. In local files, only the date can be set.

```
public void setAttributes(String path, FileAttributes attributes)
    throws FileSystemException
    {
        Object lastModified =
    attributes.get(FileAttributes.ATTR_LASTMODIFIED);
        if (lastModified!=null)
        {
            File file = getLocalFileObject(path);
            if (!file.exists( ))
                throw new
    FileSystemException(res.getString("File_does_not_exist"));
            file.setLastModified(lastModified instanceof Long
                ? ((Long)lastModified).longValue( )
                : ((Date)lastModified).getTime( ));
            fileChanged(path);
        }
    }
}
```

Figure 5:
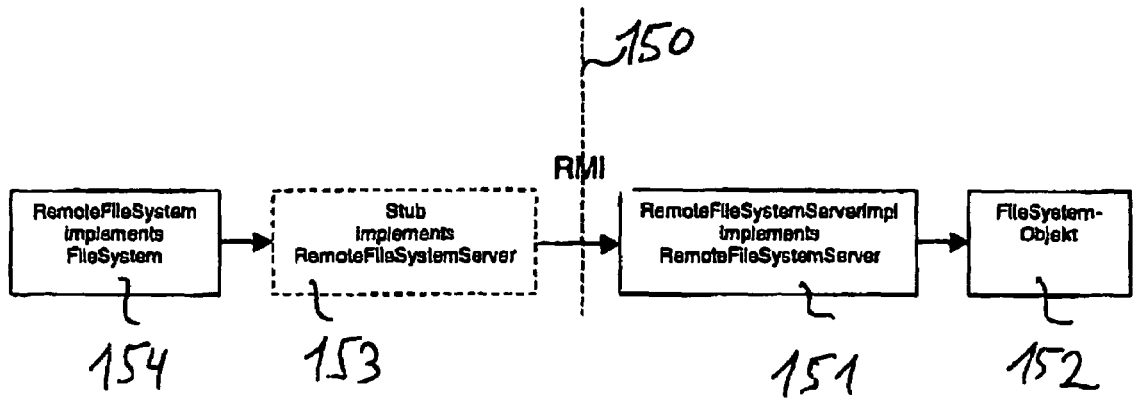
FIG. 5 is a system structure for a remote file system interface.

RemoteFileSystem:

This class enables the access to a FileSystem object 152 that is stored in another computer. As shown in FIG. 5, the communication occurs across the computer boundary 150 via the Java-inherent network protocol RMI. For this, a server that implements the interface RemoteFileSystemServer 151 must exist on the opposite side.

The stub component 153 encapsulates the RMI protocol and normally does not appear. The RemoteFileSystem 154 acts opposite a file system that calls the RemoteFileSystem 154 just like the FileSystem object 152 on the server side, in that it delegates all actions there. For the RemoteFileSystem 154, the stub component 153 acts in turn just like the server-side file object 152, meaning it accesses the FileSystem object 153 via the interface RemoteFileSystemServer 151.

```
public class RemoteFileSystem implements FileSystem
{
    public String[ ] list(String directory) throws FileSystemException
    {
        try
        {
            return getServer( ).list(directory);
        }
        catch (RemoteException re)
        {
            throw new RemoteFileSystemException(re);
        }
    }
}
```

The list method delegated executes the list method of the server that in turn calls the list method of its FileSystem object. Since an error can ensue upon remote call, the RemoteException must be intercepted and converted into a FileSystemException.

The class RemoteFileSystemServerImpl now following, or its derivations, serves as a link between the RemoteFileSystem and the FileSystem object that should be addressed. It implements a proprietary remote interface RemoteFileSystemServer (file RemoteFileSystemServer.java) that defines the method that the RemoteFileSystem can call on the server.

```
public class RemoteFileSystemServerImpl extends
MultiInstanceServerImpl
            implements RemoteFileSystemServer
{
```

The server has a variable of the type FileSystem to which all actions of the RemoteFileSystem are delegated.

```
private FileSystem fileSystem;
```

The list method of the server calls the list method of the FileSystem object and returns the result to the RemoteFileSystem on the client side. It is checked beforehand as to whether the user of the RemoteFileSystem has read rights on the server. For error protocolling, possible exceptions (errors) are intercepted, protocolled and thrown again.

```
public String[ ] list(String directory) throws FileSystemException
{
    try
    {
        checkRead(directory);
        return getFileSystem( ).list(directory);
    }
    catch (RuntimeException re)
    {
        log.warning("list failed for '"+directory+"'.",re);
        throw re;
    }
    catch (FileSystemException fse)
    {
        log.warning("list failed for '"+directory+"'.",fse);
        throw fse;
    }
}
```

Furthermore, RemoteFileSystemServerImpl provides a socket interface that can access its FileSystem via non-Java programs.

DelegateFileSystem:

This class serves to delegate dependent on path names, actions and various FileSystem objects. Logical paths can thereby be defined for which whole defined FileSystem objects are appropriate. For example, in the described system environment, the path /$PFL/ . . . / . . . is valid as a path for a print file library. This print file library is addressed via a FileSystem object, developed specially for it, that implements its properties such as, for example, versioning of data.

```
public class DelegateFileSystem implements FileSystem
{
    public interface PathSelector
    {
        public boolean accept(String path);
    }
}
```

Via the interface PathSelector, it is decided whether a FileSystem is appropriate for a given path.

With addFileSystem( ), a FileSystem object with associated PathSelector is added to the DelegateFile system:

```
public void addFileSystem(FileSystem fileSystem, PathSelector
pathSelector)
{
    if (fileSystems==null)
        fileSystems = new Object[ ] { fileSystem,pathSelector };
    else
    {
```

```
        Object[ ] newFileSystems = new Object[fileSystems.length+2];
        System.arraycopy(fileSystems,0,newFileSystems,0,fileSystems.length);
        newFileSystems[newFileSystems.length-2] = fileSystem;
        newFileSystems[newFileSystems.length-1] = pathSelector;
        fileSystems = newFileSystems;
    }
}
```

The method findFileSystem finds the appropriate FileSystem at a specified path. This method is called by all other methods via getFileSystem( ) in order to delegate an action. The method getFileSystem( ) calls findFileSystem( ) and throws an exception when this has found no appropriate FileSystem.

```
public FileSystem findFileSystem(String path)
{
    if (fileSystems==null || path==null)
        return null;
    for (int i=fileSystems.length-1; i>=0; i-=2)
        if (((PathSelector)fileSystems[i]).accept(path))
            return (FileSystem)fileSystems[i-1];
    return null;
}
public FileSystem getFileSystem(String path) throws
FileSystemException
{
    FileSystem fs = findFileSystem(path);
    if (fs==null)
        throw new FileSystemException("File system not found for
"'+path+"'");
    return fs;
}
```

The method isDirectory calls getFileSystem (and with it, indirectly, findFileSystemo( ))) in order to determine the appropriate FileSystem for the specified path, and calls its isDirectory( ) method.

```
public boolean isDirectory(String path) throws FileSystemException
{
    return getFileSystem(path).isDirectory(path);
}
}
```

MirrorFileSystem:

This class serves to keep synchronized a plurality of FileSystem objects (for example, directories on various computers).

```
public class MirrorFileSystem implements FileSystem
{
    private Map mirrors = new HashMap( );
    private FileSystem masterMirror;
```

With the methods addMirror and removeMirror, mirrored FileSystem objects are added or, respectively, removed. The first added FileSystem is the master, which serves as a reference.

```
public void addMirror(String name, FileSystem mirror)
{
    if (mirrors.size( )==0)
        setMasterMirror(mirror);
    mirrors.put(name,mirror);
}
public void removeMirror(String name)
{
    mirrors.remove(name);
}
```

The method move( ) calls the move method for all mirrored FileSystem objects in order to move a file. If an error occurs in one of these actions, all preceding actions are countermanded, meaning the file is again renamed with its original name.

```
forAllMirrorsDo(new Undoable( )
{
    public void run(FileSystem fileSystem) throws FileSystemException
    {
        fileSystem.move(source,destination);
    }
    public void undo(FileSystem fileSystem) throws FileSystemException
    {
        fileSystem.move(destination,source);
    }
});
}
```

Figure 6:
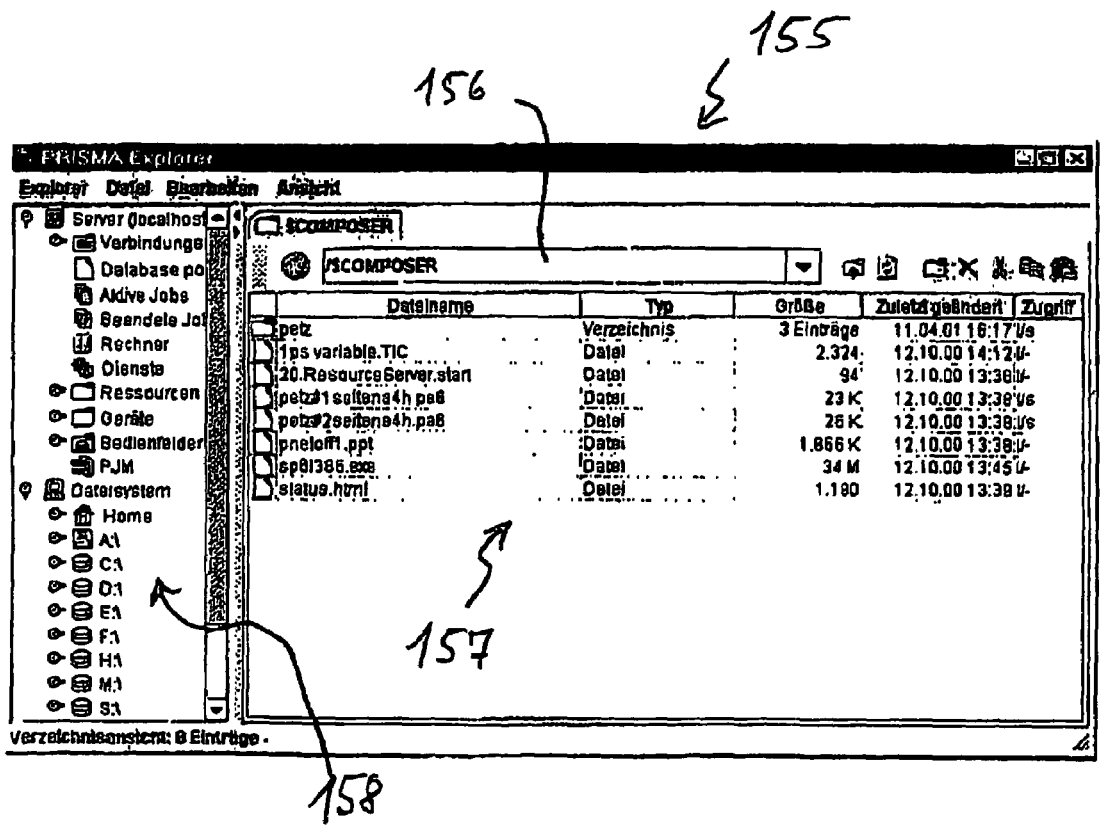
FIG. 6 is a graphical user interface for a JAVA file system interface.

Shown in FIG. 6 is a monitor printout, generated with an applet, on which a mask 155 is shown with which the processing and administration of files is enabled using a graphical user interface. The mask 155 displays a directory in field 156 and enables processing and administration operations with this and with the files (that are displayed in the region 157) contained in the directory. All available computers or directories are shown in field 158 like a tree structure.

The system and method can be advantageously used in a print system as in FIG. 1, in that print data or print jobs are relocated from a client computer and are transferred to a master that receives the data or, respectively, the job. Resource data, in particular of print jobs in the data format AFP, that are stored on a networked computer or should be kept synchronized on multiple networked computers can thereby be administered by the client computer. For this, it is in particular advantageous when the following configurations are adhered to:

a server of the type SlaveFileSystemServerlmpl is installed on each slave for the file access from the master to the slave. This is a derivation of the RemoteFileSystemServerlmpl class and ensures that it is not illegally used directly by a client For the access from the clients to the master, a server of the type RemoteFileSystemServerlmpl (for example, ResourceServerlmpl for resource administration) is installed on these multiple servers. These access the local and the file systems of the slaves via a combination of DelegateFileSystem, MirrorFileSystem and RemoteFileSystem objects.

On the client, there are viewers to display and process a FileSystem object. The applet shown in FIG. 5 will assign to this viewer a DelegateFileSystem that comprises a LocalFileSystem for local file access and multiple RemoteFileSystem objects for access to server files.

The file system specified above in particular allows a data transfer of print data between various print servers to be effected supervised. For this, in the file system a foreign connection interface (JAVA socket) can be provided via which print data are transferred from a first print server whose files are not directly administered by the file system to a second print server whose files are directly administered by the file system. The print data can thereby first be distributed (as previously specified) to a plurality of print servers, meaning to a print server cluster, and then be sent to a print server of the cluster for execution, the files of said print server being directly administered by the file system.

Although a specific master computer is shown in the exemplary embodiments, in principle in a network of print servers this property can be allocated to any of the connected computers. In particular, it is possible in such a system to allow each of the connected print servers access to the central control system, and in particular to enable modifications of the system settings via a graphical user interface (monitor with input means such as a mouse or keyboard or also a touch screen). The basic idea of a central administration is thereby maintained, which, however, can be accessed decentrally in a network. Although only one network has been shown for the print server, it is by all means possible to again separately connect individual print servers among one another, or for example with the host computer, for example via dedicated network connection or a direct connection.

Although some aspects have been explained using the programming language JAVA, it can also be executed with other object-oriented programming languages such as, for example, C++. Not only methods, devices and computer programs are specified with the invention, but also computer program products such as storage media (diskettes, CD-ROMs, etc.) that, upon loading and running of computer program on a computer, effect an inventive method process.

Although the system has been explained using a file system programmed in Java, it can also be implemented in any other file systems.

The system is in particular suited to be realized as a computer program (software). It can therewith also be distributed as a computer program module, as a file on a data medium such as a diskette or CD-ROM, or as a file via a data or communication network. Such and comparable computer program products or computer program elements are embodiments. The process can be applied in a computer, in a print device or in a print server with upstream or downstream data processing devices. It is thereby clear that corresponding computers on which the system is applied can comprise further known technical devices such as input means (keyboard, mouse, touchscreen), a microprocessor, a data or, respectively, control bus, a display device (monitor, display) as well as a working storage, a fixed disc storage and a network card.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for storage and retrieval of print data, comprising the steps of:

transferring print data of a print job in blocks from a data source to at least two of a plurality of print servers connected with one another which form a network and are stored in the print servers, and wherein respective control data for the blocks is transmitted to the print servers of the network and are registered and stored in the print servers;

said network also having a central control module, and also registering the control data in said central control module of the network;

allocating further processing of the print job by said central control module of the network to an allocated print server of the network such that the allocated print server receives the control data from said central control module;

using the control data received from the central control module reading with the respectively allocated print server the print data in at least one block from at least one other print server in the network;

with said allocated print server forwarding the print data to a processing device; and wherein for the above steps in a first on-the-fly operating mode, already forwarding at least one part of previously input and stored data of the same print job for further processing in the processing device during the input of data of a print job in the network, and in a second on-the-fly operating mode, reading by a second print server data of a print job that are stored in a first print server and forwarding the data directly, without buffering, to a processing device connected to the second print server.

2. A method according to claim 1 wherein a computer program running in a master print server of the network is used as the central control module.

3. A method of claim 2 wherein a computer that comprises a mirrored storage disc system is used at least as the master print server.

4. A method according to claim 1 wherein a control program running in at least one of said at least two print servers receiving the print data transfers its control data to the central control module.

5. A method according to claim 1 wherein the control data respectively comprise information about at least one of storage location of the print data associated with control data, job corollary data and position of the associated print data associated with the control data within the print job.

6. A method according to claim 4 wherein by means of the control data retrieval of the print data by the at least one print server occurs in a sequence, in blocks, adapted to the print job.

7. A method according to claim 1 wherein respective one master-slave relationship exists between a master print server and remaining print servers.

8. A method according to claim 1 wherein at least one print device is used as the processing device.

9. A method according to claim 1 wherein a raster processor is used as the processing device.

10. A method according to claim 1 wherein the print server sends regular status information about progress of the job processing to the central control module.

11. A method according to claim 10 wherein the central control module effects the allocation for processing of new print jobs to the respective print server on the basis of at least one of status information and a priority specification of the print job.

12. A method according to claim 1 wherein the central control module is accessed by any of the print servers of the network.

13. A method according to claim 1 wherein the print data are imported into the network from at least one of a computer, a tape reading device, and a further network.

14. A method according to claim 1 wherein during the processing of a print job in a first print server a stop command is sent from the central control module to the first print server, and for further processing of the print job in a second print server control information necessary for the further processing are sent to the second print server.

15. A method according to claim 1 wherein
resource data are respectively stored in the print servers;
a resource update is initially implemented only in a master print server;
regarding resource data necessary for a print job, a slave print server respectively implements a version query to the master print server such that using the version query it is checked in the master print server whether resource data stored in it are identical to resource data located on the querying slave print server; and
upon determination of a discrepancy between the versions by the master print server, as necessary a younger version is transmitted to the slave print server and is used for the print job.

16. A method for storage and retrieval of print data, comprising the steps of:
transferring print data of a print job in blocks from a data source to at least two of a plurality of print servers connected with one another which form a network and are stored in the print servers, and wherein respective control data for the blocks is transmitted to the print servers of the network and are registered and stored in the print servers;
said network also having a central control module, and also registering the control data in said central control module of the network;
allocating further processing of the print job by said central control module of the network to an allocated print server of the network such that the allocated print server receives the control data from said central control module;
using the control data received from the central control module reading with the respectively allocated print server the print data in at least one block from at least one other print server in the network;
with said allocated print server forwarding the print data to a processing devices;
using a computer program generated in an object-oriented programming language for administration and processing of computer files, whereby
functions and methods for administration and processing of files are specified with an operating system-independent interface program module; and
an abstract file system class is formed that implements at least one part of functions and methods of the system-independent interface program module, which in turn is used by implementations derived therefrom.

17. A method according to claim 16 wherein the interface program module is installed at a plurality of locations in a computer network, such that at least one of a hierarchical and chained access to at least one of logical and physical files is enabled.

18. A method according to claim 17 wherein the interface program module is respectively attached to implementations via which a functionality of the abstract file system is expanded.

19. A method according to claim 16 wherein at least one further file system class is derived from the abstract file system class to expand functionality of the abstract file system.

20. A method according to claim 18 wherein the interface program module is additionally added to a further file system class.

21. A method according to claim 20 wherein provided as a further file system class is at least one of:
a remote file system that allows an access to files on another computer;
a mirror file system that administers a plurality of directories and files provided therein synchronously on various units; and
a delegate file system that administers a plurality of file systems and administers file function calls dependent on a respective path of the corresponding file on the file systems.

22. A method according to claim 16 wherein the interface program module defines only names of methods with which at least one of abstract and physical file systems are accessed with their input and response values.

* * * * *